US011924800B2

(12) United States Patent
Okano et al.

(10) Patent No.: US 11,924,800 B2
(45) Date of Patent: Mar. 5, 2024

(54) POSITIONING SYSTEM, MOBILE TERMINAL, AND PROGRAM

(71) Applicant: SEIKO EPSON CORPORATION, Tokyo (JP)

(72) Inventors: Keiichi Okano, Chino (JP); Yuichi Mori, Minowa-Machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 69 days.

(21) Appl. No.: 17/237,073

(22) Filed: Apr. 22, 2021

(65) Prior Publication Data

US 2021/0337500 A1    Oct. 28, 2021

(30) Foreign Application Priority Data

Apr. 24, 2020    (JP) ................................. 2020-077198

(51) Int. Cl.
*H04W 64/00* (2009.01)
*G01S 19/05* (2010.01)
*G01S 19/34* (2010.01)

(52) U.S. Cl.
CPC ............. *H04W 64/00* (2013.01); *G01S 19/05* (2013.01); *G01S 19/34* (2013.01)

(58) Field of Classification Search
CPC ......... H04W 64/00; G01S 19/34; G01S 19/05
See application file for complete search history.

(56) References Cited

U.S. PATENT DOCUMENTS

| 9,706,513 | B2* | 7/2017 | D'Argenio | ........ H04W 52/0209 |
| 2011/0199917 | A1* | 8/2011 | Karaoguz | ............. H04W 4/029 |
| | | | | 370/252 |
| 2013/0006529 | A1 | 1/2013 | Miyamoto | |
| 2019/0116576 | A1* | 4/2019 | Terävä | .................. H04W 4/027 |
| 2019/0228660 | A1 | 7/2019 | Amano et al. | |
| 2020/0128486 | A1 | 4/2020 | Herrmann | |
| 2021/0084264 | A1* | 3/2021 | Jeromin | ................... H04N 5/44 |

FOREIGN PATENT DOCUMENTS

| CN | 105072569 | A | * | 11/2015 | ............... E04C 3/34 |
| EP | 3311628 | B1 | * | 5/2021 | ............. G06F 3/162 |
| JP | 2001021366 | | | 1/2001 | |
| JP | 2012002568 | | | 1/2012 | |
| JP | 2018048955 | | | 3/2018 | |

* cited by examiner

*Primary Examiner* — Muthuswamy G Manoharan
(74) *Attorney, Agent, or Firm* — JCIPRNET

(57) ABSTRACT

In a positioning system configured to perform positioning using N mobile terminals, where N is an integer of two or greater, each of the mobile terminals includes a positioning device, a communication device configured to exchange information with another mobile terminal using wireless communication, and a battery configured to supply power to the positioning device and the communication device. Each of first mobile terminals that are some of the mobile terminals activates the positioning device to perform positioning of a first current position, and a second mobile terminal other than the first mobile terminals reduces at least power to be used by the positioning device, and uses information of the first current position positioned by the first mobile terminal, and the information exchanged with the first mobile terminal by the communication device to perform positioning of a second current position.

8 Claims, 11 Drawing Sheets

| MOBILE TERMINAL | 50a | 50b | 50c | 50d | 50e | 50f | 50g | 50h |
|---|---|---|---|---|---|---|---|---|
| GPS POWER CONSUMPTION | MEDIUM | SMALL | LARGE | LARGE | MEDIUM | MIDDLE | SMALL | LARGE |
| POSITIONING ACCURACY | HIGH | HIGH | MIDDLE | LOW | LOW | HIGH | HIGH | LOW |
| CPU CAPABILITY | HIGH | MIDDLE | LOW | HIGH | LOW | HIGH | HIGH | MIDDLE |

FIG. 10

POSITIONING SYSTEM, MOBILE TERMINAL, AND PROGRAM

The present application is based on, and claims priority from JP Application Serial Number 2020-077198, filed Apr. 24, 2020, the disclosure of which is hereby incorporated by reference herein in its entirety.

BACKGROUND

1. Technical Field

The present disclosure relates to a positioning technology.

2. Related Art

A positioning system (GNSS) that detects a position on the ground surface by using a positioning satellite has been known. Also, a technique has been proposed in which a plurality of beacons are located on the ground surface, and radio waves from the respective beacons are detected to perform positioning. JP-A-2018-48955 proposes that, in order to achieve power saving, when positioning using beacons can be performed, an operation of a circuit for GNSS having large power consumption is stopped.

However, the power saving in JP-A-2018-48955 is based on the assumption that a large number of beacons are disposed on the ground surface, and is effective at indoor locations or the like where beacons are disposed, but the power saving cannot be achieved at locations where beacons are not disposed, for example, at outdoor locations, typically in a case of hiking, climbing, or the like.

SUMMARY

The present disclosure can be implemented as the following exemplary embodiments or application examples. A first aspect of the present disclosure is an aspect of a positioning system configured to perform positioning using N mobile terminals, where N is an integer of two or greater. In the positioning system, each of the mobile terminals includes a positioning device configured use a radio wave to perform positioning, a communication device having smaller power consumption than the positioning device and being configured to exchange information with another mobile terminal using wireless communication, and a battery configured to supply power to at least the positioning device and the communication device.

Further, not less than one and less than N first mobile terminals among the mobile terminals are configured to activate the positioning device to perform positioning of a first current position, and a second mobile terminal other than the first mobile terminals among the mobile terminals is configured to at least reduce power to be used by the positioning device, and is configured to perform positioning of a second current position using information of the current position positioned by the first mobile terminal, and the information exchanged with the first mobile terminal by the communication device.

A second aspect of the present disclosure is an aspect of a mobile terminal. The mobile terminal configured to communicate with another mobile terminal being in a predetermined communication range includes a positioning device configured use a radio wave to perform positioning, a communication device having smaller power consumption than the positioning device, and being configured to detect a relative positional relationship with another mobile terminal using wireless communication, a battery configured to supply power to at least the first positioning system and second positioning system, is configured to at least reduce power to be used by the positioning device when the mobile terminal is communicable with another mobile terminal configured to perform positioning of a current position, and is configured to perform positioning of a current position using information of the current position of the other mobile terminal positioned by the other mobile terminal, and the relative positional relationship detected by the communication device.

A third aspect of the present disclosure is an aspect of a non-transitory computer-readable storage medium storing a program to be executed by a computer configured to control a mobile terminal configured to communicate with another mobile terminal being in a predetermined communication range. The program implements, in a mobile terminal, a function of operating a positioning device configured to perform positioning using a radio wave, a function of operating a communication device having smaller power consumption than the positioning device, and being configured to detect a relative positional relationship with another mobile terminal using wireless communication, a function of at least reducing power to be used by the positioning device when the mobile terminal is communicable with another mobile terminal configured to perform positioning of a current position, and a function of using information of the current position of the other mobile terminal positioned by the other mobile terminal, and the relative positional relationship detected by the communication device to perform positioning of a current position.

BRIEF DESCRIPTION OF THE DRAWINGS

FIG. 10 is an explanatory diagram exemplifying data from each mobile terminal as a list.

DESCRIPTION OF EXEMPLARY EMBODIMENTS

A. First Exemplary Embodiment (1) Hardware Configuration:

A positioning system 10 according to a first exemplary embodiment is configured of N mobile terminals (N is an integer of two or more) that are used by a plurality of users, and a positioning satellite SS. Among the N mobile terminals, M number of mobile terminals (M is an integer equal to or greater than one and smaller than N) function as first mobile terminals, and the remaining N−M number of mobile terminals function as second mobile terminals. The first exemplary embodiment will be described using a case where N=3, M=1 as an example.

As illustrated in FIG. 1A, the positioning system 10 according to the first exemplary embodiment is configured of three mobile terminals 50A, 50B, and 50C configured to receive a radio wave from the positioning satellite SS. When the respective mobile terminals are not distinguished, the mobile terminals are referred to as mobile terminals 50. The mobile terminals 50A, 50B, and 50C are respectively carried by users PS1, PS2, and PS3. Among these mobile terminals, the mobile terminal 50B being carried by the user PS2 has a function of outputting an image to an eyeglass type head-mounted display apparatus (hereinafter simply referred to as an HMD) to be mounted on the head of the user PS2, and is actually used in a state of being coupled to an HMD 60. The coupling between the HMD 60 and the mobile terminal 50B may be wired or may be wireless.

As will be described below, each mobile terminal 50 is provided with a function of receiving radio waves from a plurality of positioning satellites SS orbiting the earth to identify a current position. GPS is used in the exemplary embodiment to perform positioning by a global navigation satellite system (hereinafter, also simply referred to as GNSS) that performs positioning by receiving radio waves from a plurality of positioning satellites SS. Examples of GNSS include, in addition to GPS being operated by the United States, GLONASS being operated by the Russian Federation, the BeiDou system (BDS) being operated by China, and the like. As a position specifying unit, one of these systems may be used, or a plurality of types of systems may be used in combination. When GNSS is used, positioning can be performed anytime, anywhere on the earth. Moreover, the respective mobile terminals 50 have a function of exchanging beacons with each other. In this exemplary embodiment, as the beacon, a beacon in accordance with Bluetooth Low Energy® is used. This is hereinafter referred to as a BLE beacon. The BLE beacons may include any information in addition to IDs with which the respective mobile terminals identify one another. The BLE beacons can be used both in a way of exchanging information by performing so-called pairing where the respective mobile terminals recognize each other and exchange exclusive information with each other, and in a way of acquiring information without performing the pairing.

Figure 2:
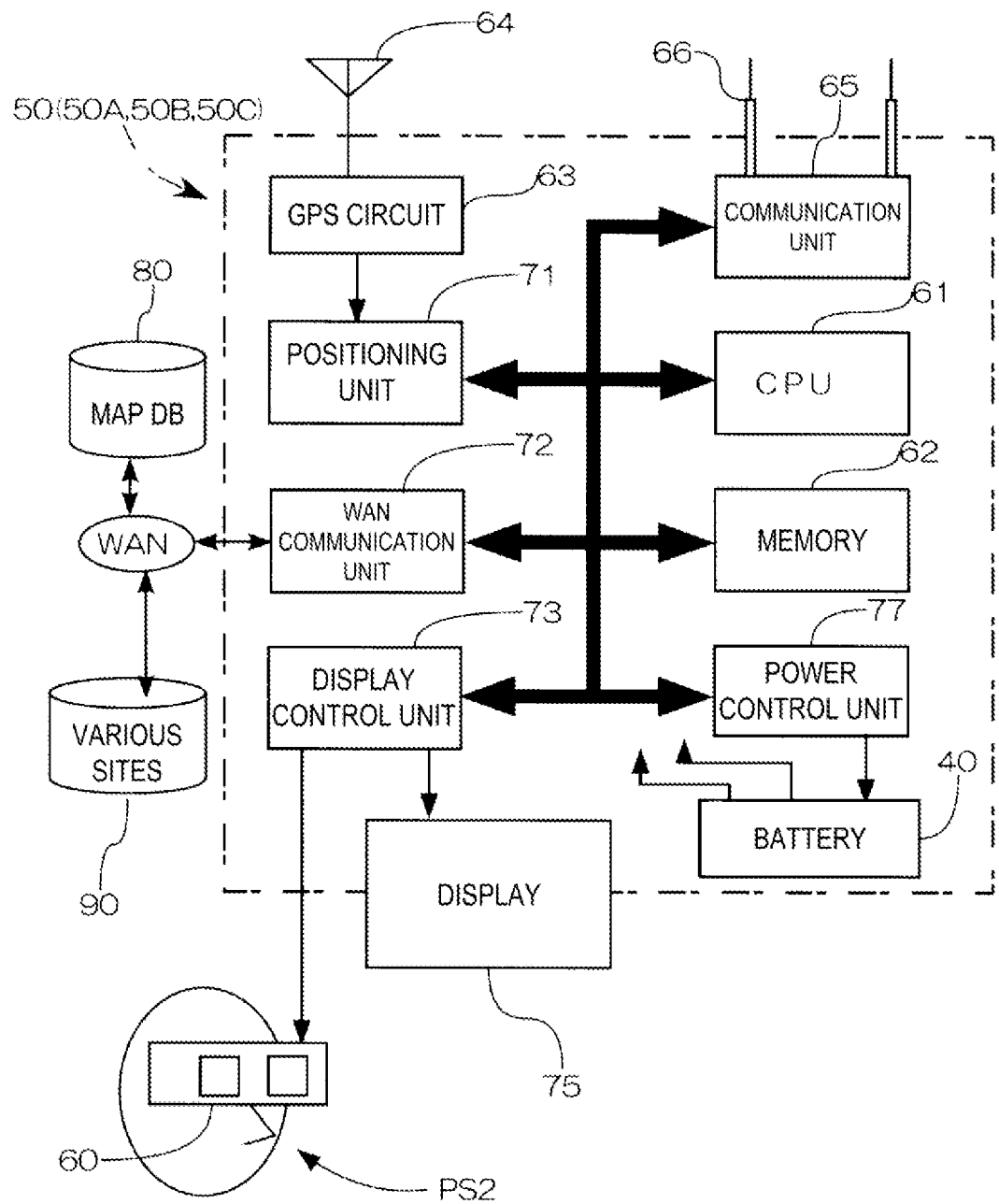
FIG. 2 is a schematic configuration diagram of a mobile terminal.

FIG. 2 illustrates an internal configuration of the mobile terminal 50. As illustrated in the figure, the mobile terminal 50 operates by power of a battery 40. In addition to the battery 40, the mobile terminal 50 includes a CPU 61 that controls the entire mobile terminal 50, a memory 62 that stores programs and various types of data, a GPS circuit 63 that detects a radio wave from the positioning satellite SS, a communication unit 65 serving as a communication device configured to exchange information with another mobile terminal by using a BLE beacon, a positioning unit 71 that performs positioning a self-position by using a detection result from the GPS circuit 63, a WAN communication unit 72 that acquires information via an external wide area network (WAN), a display control unit 73 that controls displaying on an incorporated display 75 and an external display device, a power control unit 77 that supplies power from the battery 40 to each unit, and the like. The GPS circuit 63 and the communication unit 65 respectively include an antenna 64, and antennas 66 that are configured to perform communication. Additionally, the WAN communication unit 72 acquires desired data by the exchange with an external map database (abbreviated as DB in the FIG. 80 and various sites 90 via the WAN. From the map database 80, a map including a current position is acquired. From the various sites 90, for example, position information of GPS satellites available to the GPS circuit 63, and the like are acquired.

The GPS circuit 63 and the positioning unit 71 configure a positioning device. Actually, the positioning unit 71 is a program that performs positioning of a current position based on data acquired by the GPS circuit 63 from the positioning satellites SS, and the GPS circuit 63 is related to power consumption. The positioned data includes latitude, longitude, and altitude. Based on signals received by the GPS circuit 63 from the positioning satellites SS, an arithmetic operation for determining such information of a current position may be performed by the hardware of the GPS circuit 63.

In FIG. 2, the mobile terminal, that is, the mobile terminal 50B is illustrated in which the HMD 60 mounted on the head of the user PS2 together with the display 75 are coupled to the display control unit 73, but functions other than the coupling of the HMD 60 are similar to those of the mobile terminals 50A, and 50C. Note that, although not illustrated in FIG. 2, each mobile terminal 50 also functions as a so-called mobile phone (smartphone). Alternatively, each mobile terminal that configures the positioning system 10 may be a dedicated mobile terminal that does not have a function of a telephone call.

The power control unit 77 controls power supply from the battery 40 to each unit. In each mobile terminal 50, the power control unit 77 is used to finely limit power supply to a circuit that is not being used in order to suppress power consumption of the battery 40. In particular, since the power consumption of the GPS circuit 63 and the display 75 is large, the power supply to these circuits and the like is switched off other than when the power supply is necessary. Further, the power control unit 77 can detect the remaining capacity of the battery 40. The power control will be described in detail later.

In the positioning system 10 according to the first exemplary embodiment, the three mobile terminals 50A, 50B, and 50C are cooperation with one another to perform positioning and to share the information of the positioned current position. Before processing associated with the positioning, each mobile terminal 50 executes an operation mode setting processing routine illustrated in FIG. 3. Each mobile terminal 50 performs the illustrated processing only once before processing as the positioning system 10. The processing illustrated in FIG. 3 is performed by activating an application program installed in each mobile terminal 50.

Figure 1:
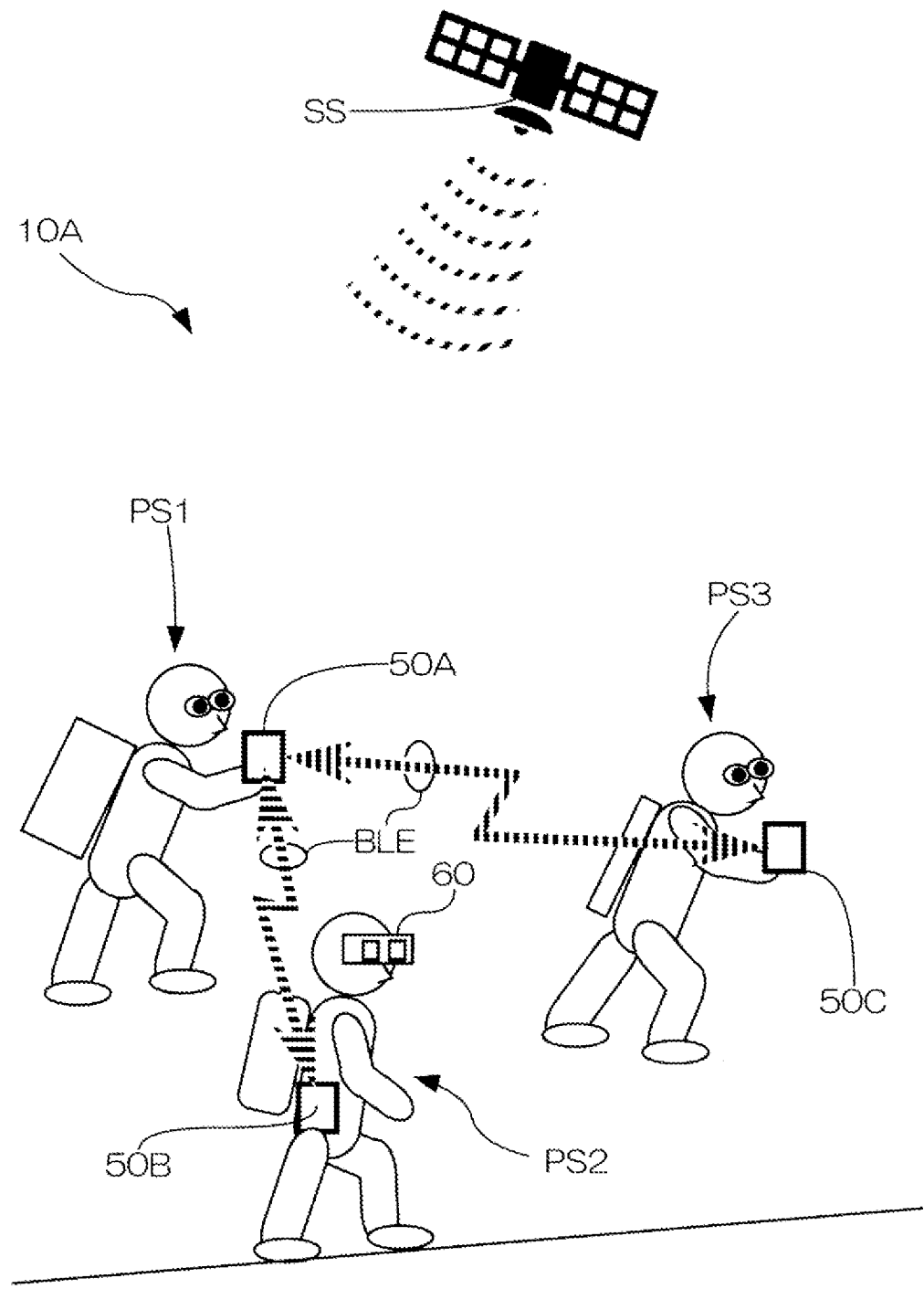
FIG. 1 is an explanatory diagram illustrating a positioning system of a first exemplary embodiment together with a use form.
Figure 3:
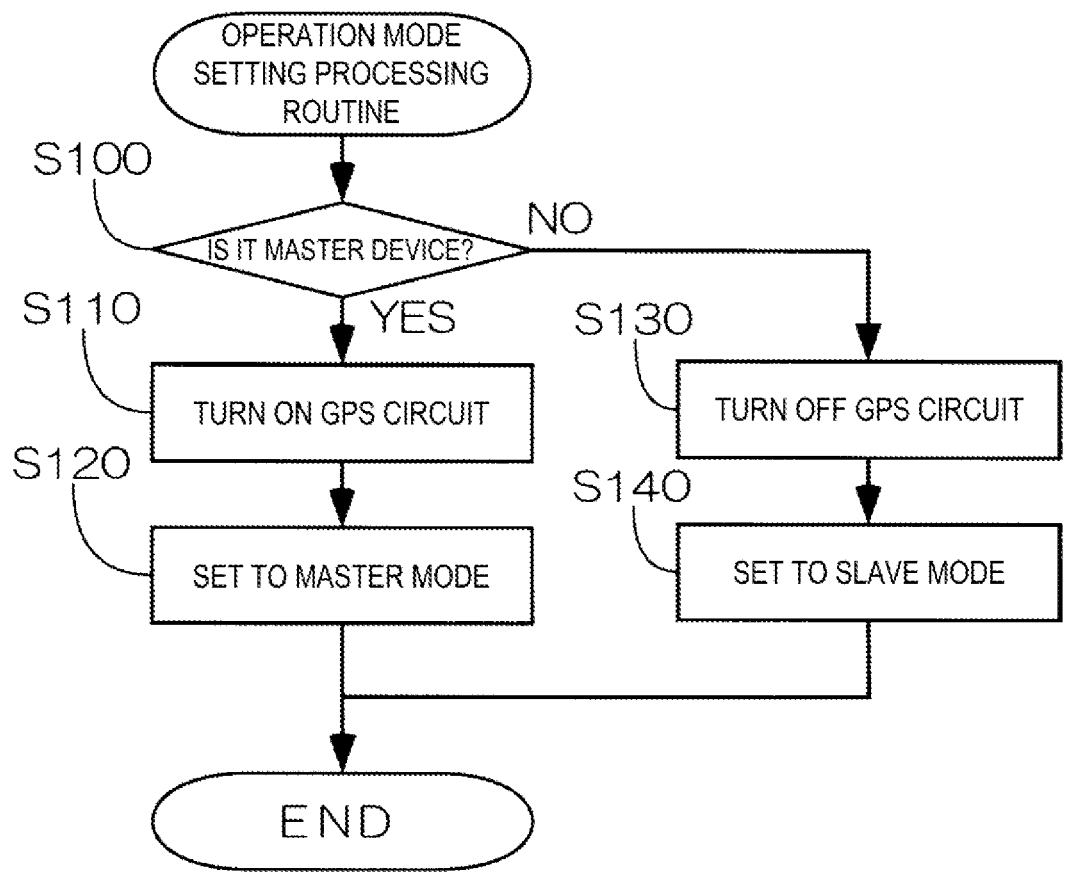
FIG. 3 is a flowchart illustrating an operation mode setting processing routine to be performed by each mobile terminal of the first exemplary embodiment.

When the operation mode setting processing routine illustrated in FIG. 3 is activated, first, whether the mobile terminal 50 executing this processing routine is a master device or not is determined (step S100). Here, the master device is a device that performs positioning by the GPS circuit 63, that is, a first mobile terminal. In the first exemplary embodiment, whether the mobile terminal 50 performing the processing is a master device or not is negotiated in advance among the users of the respective mobile terminals 50. In the first exemplary embodiment, as illustrated in FIG. 1, the users PS1 to PS3 are assumed to negotiate so that the mobile terminal 50A being used by the user PS1 operates as a master device.

Thus, when the mobile terminal 50A executes the processing routine illustrated in FIG. 3, the mobile terminal 50A determines itself to be the master device (step S100: "YES"), turns on the GPS circuit 63 (step S110), sets itself to a master mode (step S120), and exits to "END" to terminate the processing. Turning on the GPS circuit 63 refers to controlling the power control unit 77 to supply power from the battery 40 to the GPS circuit 63. Alternatively, the GPS circuit 63 may be set to an operating state (on) by continuously supplying the power from the battery 40, reducing the power consumption of the GPS circuit 63 by making the frequency of an operation clock of the GPS circuit 63 small (approximately 0 Hz as long as possible), and returning the frequency of the clock of the GPS circuit 63 to a normal value in step S110. Setting to the master mode means that operating as the master device is stored in a predetermined region of the memory 62 by using the value of a flag, and the like.

On the other hand, in a case of the mobile terminal 50B, or 50C, since the determination in step S100 becomes "NO", the processing moves to step S130, turns off the GPS circuit 63 (step S130), sets the mobile terminal itself to a slave mode that is to operate as a slave device, that is, a second mobile terminal (step S140), and then exits to "END" to terminate the processing. Powering off the GPS circuit 63 may be achieved by controlling the power control unit 77 to stop the power supply from the battery 40, or as described above, may be achieved by causing the operation frequency of the GPS circuit 63 to be reduced or to be zero to substantially stop the operation, and reducing the power consumption of the GPS circuit 63. When the mobile terminal operates as the slave device, the power consumption of the GPS circuit 63 is at least reduced. and is set to 0 as long as possible. Setting the slave mode means that operating as the slave device is stored in a predetermined region of the memory 62 by using the value of a flag or the like. The flag that indicates operating as the slave device and the flag that indicates operating as the master device may be mutually exclusive values, for example, a value of 1 and a value of 0, written in the same region.

(2) Processing in Each Mobile Terminal:

In the operation mode setting processing routine illustrated in FIG. 3, it is predetermined which of the mobile terminals 50 serves as a master device, and that the mobile terminals 50 other than the master device serve as slave devices. Which of the mobile terminals 50 serves as a master device/slave device may be manually set by each of the users PS1 to PS3 tapping the screen of the corresponding mobile terminal 50, or may be determined by each of the users PS1 to PS3 activating an application program. In the latter case, for example, one of the users PS1 to PS3 who gather in a range that allows the exchange of BLE beacons by the communication units 65 first activates the application program, checks whether or not there is a BLE beacon that declares to have become the master device around, and outputs a BLE beacon that declares to have become the master device when there is no BLE beacon that declares to have become the master device. Thereafter, when the application programs of the other mobile terminals 50 are activated, the mobile terminals 50 set themselves as the slave devices because there is the BLE beacon declaring to have become the master device around. When the program is made in this manner, it is possible to easily set which one of the plurality of mobile terminals 50 is set as the master device. Note that, in addition to using the communication unit 65, the setting of the master device or the slave device may be performed, for example, by displaying a code such as a two-dimensional bar code on the display 75 and causing another terminal to read the two-dimensional bar code by using a camera or the like. Alternatively, the setting of the master device or the slave device may be performed by preparing, for the master device and the slave device, two types of cards each of which is incorporated with a chip such as RFID, and causing each mobile terminal 50 to read the card.

Figure 4:
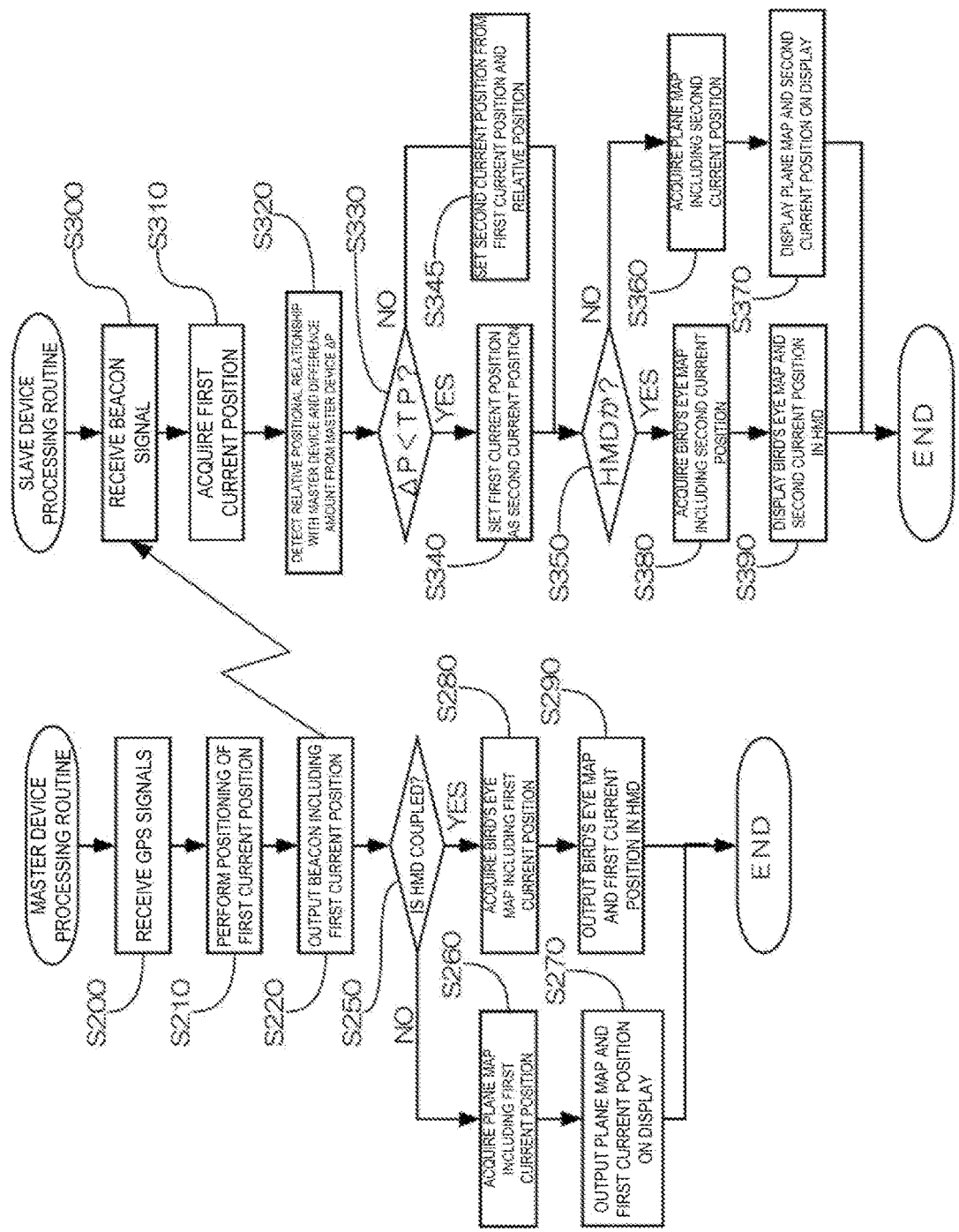
FIG. 4 is flowcharts illustrating processing to be performed by a mobile terminal operating as a master device and processing to be performed by a mobile terminal operating as a slave device.

In this manner, any one of the mobile terminals 50, here, the mobile terminal 50A is set as the master device, and the remaining two mobile terminals 50, here, the mobile terminals 50B, and 50C are set as the slave devices, and then the respective mobile terminals 50 repeatedly execute a master device processing routine or a slave device processing routine illustrated in FIG. 4 at respective predetermined intervals. First, the master device processing routine to be executed by the mobile terminal 50A will be described. Of course, although all mobile terminals 50 execute the same application program, the reason why the processing contents are different is that when executing the application program, each mobile terminal 50 determines whether the mobile terminal 50 itself is operating in the master mode or is operating in the slave mode by using the flag or the like stored in the predetermined region of the memory 62 and then operates.

The mobile terminal 50A set in the master mode first operates the GPS circuit 63 to receive GPS signals (step S200). The GPS signals are signals by radio waves from a plurality of positioning satellites from which radio waves can be received, and are predetermined signals each of which includes an ID that identifies a positioning satellite, time information, and the like. Note that positions at which positioning satellites are positioned are provided on one of the various sites 90 on the WAN, and thus, when positioning satellites from which signals can be acquired are known by accessing the site 90 in advance, the GPS signals can be easily received and analyzed.

After the GPS signals are received from the plurality of positioning satellites SS, positioning of a first current position is performed (step S210). The positions of the plurality of positioning satellites SS at a certain time are accurately determined. Thus, by analyzing the time information included in signals received from the plurality of positioning satellites SS, it is possible to accurately determine the separation between the mobile terminal 50A that has received these radio waves and the positioning satellites SS that has transmitted the radio waves. By performing this for the plurality of at least four number of SSs, the current position of the mobile terminal 50A can be accurately determined based on the same principle as that of triangulation. The position determined in such a manner is a first current position. Note that the position of a certain positioning satellite SS at a certain time is generally calculated, but may be downloaded in advance from one of the sites 90, and may be identified with reference to the downloaded position.

In this way, after the mobile terminal 50A determines the self-position as the first current position, the mobile terminal 50A outputs a BLE beacon including the first current position (step S220). Each of the other mobile terminals 50B, and 50C being around the mobile terminal 50A receives the BLE beacon to identify its current position, that is, a second current position, but before description of the processing, the processing of the mobile terminal 50A operating as the master device will be described.

After outputting the beacon including the first current position, the mobile terminal 50A operating as the master device determines whether the HMD 60 is coupled thereto or not (step S250). Since the mobile terminal 50A is not coupled with the HMD 60, the determination here is "NO", and the mobile terminal 50A acquires a plane map including the first current position from the map database 80 (step S260), and displays the acquired plane map and the first current position on the display 75 (step S270). The plane map including the first current position can be easily acquired from the map database 80 via the WAN by the WAN communication unit 72.

Figure 5:
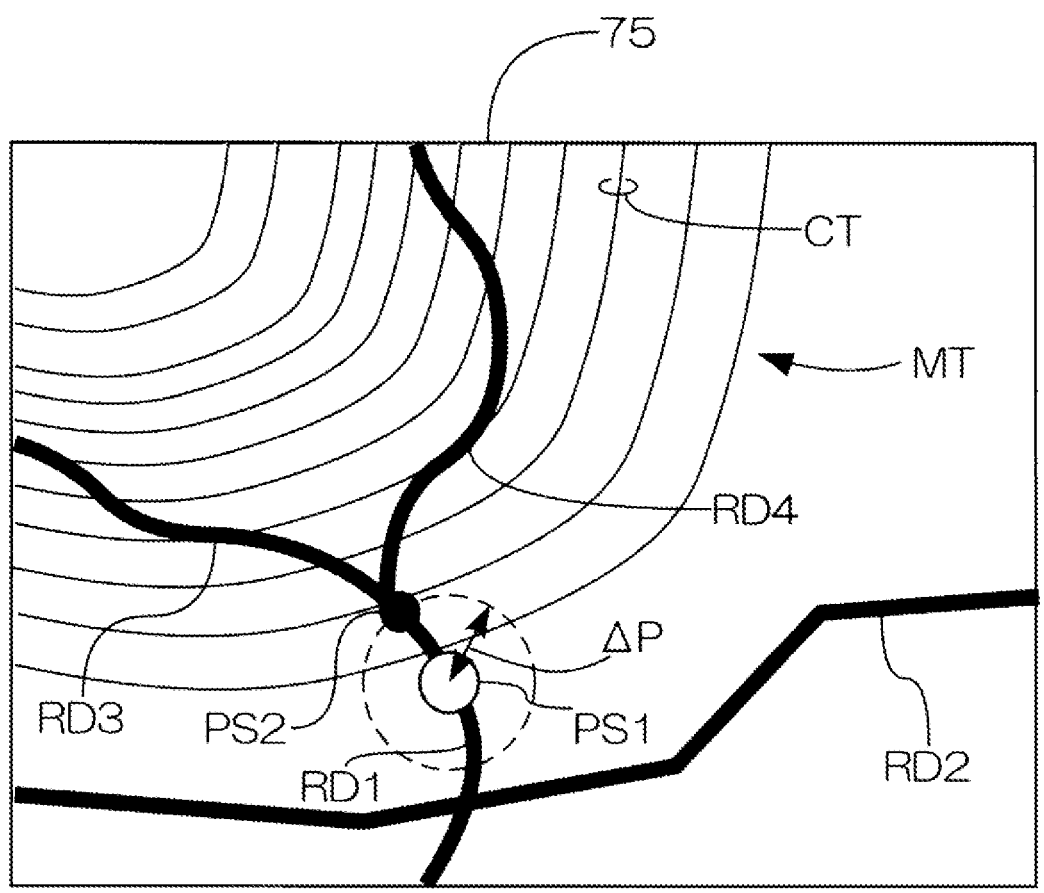
FIG. 5 is an explanatory diagram illustrating an example of a plane map and a first current position displayed on one display of a mobile terminal.

An example in which the plane map and the first current position acquired as described above are displayed on the display 75 is illustrated in FIG. 5. In this example, a first current position PS1 is displayed on a road RD1 toward a mountain area MT. The mountain area MT is displayed by using contour lines. The road RD1 toward the mountain area MT is branched into left and right roads RD3 and RD4 in the mountain area MT. Furthermore, the road RD1 toward the mountain area MT intersects with another road RD2 before the first current position PS1. In the mobile terminal 50A being used by the user PS1, since the GPS circuit 63 receives the GPS signals of the plurality of positioning satellites SS, and displays the positioned first current position together with the plane map including the first current position on the display 75 every time positioning of the first current position is performed, the user PS1 can view the display 75 to recognize the current position of the user PS1 on the map all the time.

On the other hand, when the HMD 60 is attached to the mobile terminal 50, the determination in step S250 becomes "YES", and the CPU 61 acquires a bird's eye map including the first current position from the map database 80 via the WAN communication unit 72 (step S280), and displays the acquired bird's eye map and the first current position in the HMD 60 (step S290). The bird's eye map including the first current position can be easily acquired from the map database 80 via the WAN by the WAN communication unit 72.

Figure 6:
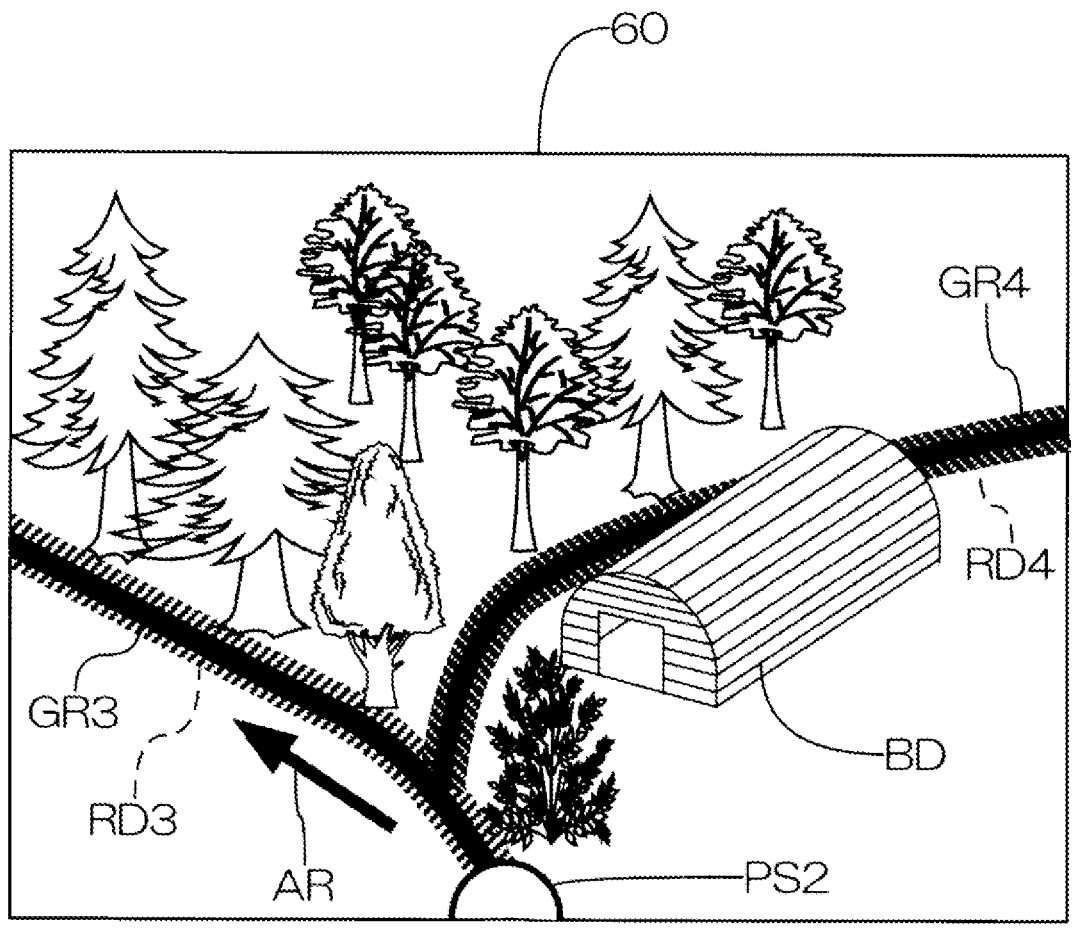
FIG. 6 is an explanatory diagram illustrating an example of a bird's eye map and a second current position displayed in one HMD of a mobile terminal.

An example of displaying the bird's eye map and the first current position in the HMD 60 as described above is illustrated in FIG. 6. In this example, the bird's eye map corresponding to the plane map illustrated in FIG. 5 is illustrated, but since the user PS1 is wearing the HMD 60, the map is displayed in an overlapped manner on an external scene which the user PS1 can visually recognize through the HMD 60. Here, a semicircle indicating the user PS1 is displayed at a central lower portion of the visual field. Advancing roads GR3 and GR4 that can be advanced are displayed in an overlapped manner on the roads RD3 and RD4 of the visible external scene. A building BD, trees, and the like are a part of the external scene that is visible through the HMD 60. In addition, in this example, a navigation function is working, and selecting the left advancing road GR3 at the next branch according to a destination input in advance is displayed by an arrow AR. In this example, as the bird's eye map, only the advancing roads GR3 and GR4 are displayed in an overlapped manner on the external scene, but names of a ridge and a peak in the mountain area MT, azimuths, street names, and the like may be displayed in an overlapped manner on the visible external scene.

Next, the right side in FIG. 4, that is, the slave device processing routine will be described. Since the slave devices, namely, the mobile terminals 50B and 50C in this exemplary embodiment are set to the slave mode, the slave device processing routine is executed repeatedly at a predetermined interval. Once the slave device processing routine is started, receiving processing of a BLE beacon is first performed (step S300). Since the mobile terminal 50A serving as the master device repeatedly executes the master device processing routine to output the BLE beacon including the first current position, the slave device can receive the BLE beacon. When receiving the BLE beacon, the mobile terminals 50B and 50C acquire the first current position from the received BLE beacon (step S310).

Further, from a strength of the received BLE beacon, a relative positional relationship with the master device and a difference amount $\Delta P$ from the master device are detected (step S320). Of these, the approximate difference amount $\Delta P$ from the master device serving as the first positioning device can be detected from the strength of the BLE beacon. Thus, it is determined whether or not the difference amount $\Delta P$ is smaller than a predetermined threshold value TP (step S330). In this case, when the difference amount $\Delta P$ is smaller than the threshold value TP, since it can be determined that the mobile terminals 50B and 50C serving as the slave devices are not so distant from the mobile terminal 50A serving as the master device, in this case, the first current position that is the position of the mobile terminal 50A serving as the master device is set as the second current position that is the positions of the mobile terminals 50B and 50C serving as the slave device (step S340). In other words, the mobile terminal 50A serving as the first mobile terminal and the mobile terminals 50B and 50C serving as the second mobile terminal are approximately at the same current position.

On the other hand, when the difference amount $\Delta P$ is larger than or equal to the threshold value TP (step S330: "NO"), the second current position that is the positions of the mobile terminals 50B and 50C serving as the slave devices is set from the first current position of the mobile terminal 50A serving as the master device, and a relative positional relationship between both of them (step S345). The relative positional relationship with the master device in this case is determined as follows. Each of the mobile terminals 50B and 50C detects, from the plane map acquired so far, the relative positional relationship with the master device by searching based on pull-in on a road on the map, that is, a prediction that the mobile terminals 50B and 50C would be present on a road. In other words, in a case of FIG. 5 as an example, the user PS2 of the mobile terminal 50B serving as the slave device can estimate that the user PS2 himself or herself is at the illustrated position PS2, as long as it is assumed that he or she is on the road RD1 on the map, from a fact that the user PS2 and the mobile terminal 50A are separated by the difference amount $\Delta P$. Of course, when a circle with a radius $\Delta P$ is drawn from the mobile terminal 50A serving as the master device, a plurality of intersections with the road may exist, but considering consistency with the path until then, the current position of the mobile terminal 50B can be approximately estimated. In particular, in a suburban area or on a mountain road, a road is not straight, and is rarely accurately orthogonal, so it is easy to narrow down a path on which the intersections with the circle with the radius $\Delta P$ continuously move. This is because, on a three-forked road such as a Y-shaped road, at an intersection that is not orthogonal, or the like, when a relative positional relationship is estimated on a road, an estimated location of a current position becomes discontinuous in a case of a wrong positional relationship.

After setting the second current position in this way, each of the mobile terminals 50B and 50C operating as the slave devices determines whether or not the HMD 60 is coupled thereto (step S350). In this exemplary embodiment, the HMD 60 is coupled to the mobile terminal 50B, but the HMD 60 is not coupled to the mobile terminal 50C. In a case of the mobile terminal 50C, the determination here is "NO", and a plane map including the second current position is acquired from the map database 80 (step S360), and the acquired plane map and the first current position are displayed on the display 75 (step S370). The plane map including the first current position can be easily acquired from the map database 80 via the WAN by the WAN communication unit 72 in a similar manner to a case of the mobile terminal 50A serving as the master device.

An example of displaying the plane map acquired as described above and the first current position on the display 75 is similar to that illustrated in FIG. 5. In the mobile terminal 50C being used by the user PS3, the GPS circuit 63 is not operated, but since the second current position determined based on the first current position of the mobile terminal 50A received by using the BLE beacon from the mobile terminal 50A serving as the master device, and the plane map including this position are displayed on the display 75, the user PS3 can view the display 75 to recognize the current position of the user PS3 on the map all the time.

On the other hand, in a case of the mobile terminal 50B to which the HMD 60 is attached, the determination in step S350 becomes "YES", and the CPU 61 acquires the bird's eye map including the second current position from the map database 80 via the WAN communication unit 72 (step S380), and displays the acquired bird's eye map and the second current position in the HMD 60 (step S390). The bird's eye map including the second current position can be easily acquired from the map database 80 via the WAN by the WAN communication unit 72 in a similar manner to a case of the mobile terminal 50A serving as the master device.

An example of displaying the bird's eye map and the second current position in the HMD 60 as described above is similar to that illustrated in FIG. 6. In this mobile terminal 50B as well, the GPS circuit 63 stops operating, and the mobile terminal 50B determines the second current position from the first current position included in the BLE beacon received from the mobile terminal 50A serving as the master device, the relative positional relationship with the master device determined from the strength of the BLE beacon, and the like, and displays the determined second current position in the HMD 60. In addition, in this example as well, a navigation function is working, and selecting the left advancing road GR3 at the next branch according to a destination input in advance is displayed by the arrow AR.

According to the first exemplary embodiment described above, among the three mobile terminals 50 that the respective three number of users PS1 to PS3 use, only in the mobile terminal 50A, the GPS circuit 63 is powered on to supply power from the battery 40, and in the mobile terminals 50B and 50C, the GPS circuit 63 is powered off. In the mobile terminals 50B and 50C set as the slave devices, the GPS circuit 63 is powered off, but by using the BLE beacon received from the mobile terminal 50A set as the master device, the first current position that is the current position of the mobile terminal 50A is received, and the second current position that is the position of each of the mobile terminals 50B and 50C is set based on the first current position and the relative positional relationship with the mobile terminal 50A and a distance from the mobile terminal 50A, that is, the difference amount ΔP and is displayed on the map. Thus, overall power consumption can be reduced when it is considered for the three number of mobile terminals 50A to 50C. Since the GPS circuit 63 is a circuit with large power consumption in many cases, such a power saving effect is large.

In addition, in this first exemplary embodiment, which of the mobile terminals 50 functions as the master device, namely, the first mobile terminal, and which of the mobile terminals 50 functions as the slave device, namely, the second mobile terminal are set in advance for the respective mobile terminals 50. Therefore, when the application program is activated in each mobile terminal 50, the respective mobile terminals 50 can immediately operate as the master device/slave device set in advance, and the user can easily understand whether the mobile terminal 50 that the user carries operates as the master device or the slave device. Furthermore, in this exemplary embodiment, when the HMD 60 is coupled to the display control unit 73, displaying the map is changed to displaying in an overlapped manner on an external scene according to the characteristics of the HMD 60 in which the external scene can be visually recognized, and further, an arrow or the like is displayed in navigation. Thus, the map and the current position can be displayed according to the aspects of the display that can be used in the mobile terminal 50.

Further, in the first exemplary embodiment, the mobile terminal in which the application program has been activated, wherein the mobile terminal can receive the BLE beacon, can receive the first current position from the mobile terminal 50A to determine the second current position that is the position of the mobile terminal itself. Accordingly, power saving can be achieved without particularly troublesome settings, specific pairing, and the like. Of course, the first current position may be encrypted, and delivery of the first current position may be limited to only the mobile terminal 50 being in a specific relationship.

B. Second Exemplary Embodiment

Next, a second exemplary embodiment will be described. A positioning system 10A according to the second exemplary embodiment is configured of eight number of mobile terminals 50*a* to 50*h* in which positioning can be performed by receiving radio waves from the positioning satellites SS. The eight number of mobile terminals 50*a* to 50*h* organize a group, and in the second exemplary embodiment, the first current position is exchanged only within the group. In the group, similarly to the first exemplary embodiment, a mobile terminal that operates as a master device, that is, a first mobile terminal, and a mobile terminal that operates as a slave device, that is, a second mobile terminal are present. In addition, in the second exemplary embodiment, there is a mobile terminal referred to as a host that assigns which of the mobile terminals in the group to a master device, and which of the mobile terminals to a slave device.

Figure 8:
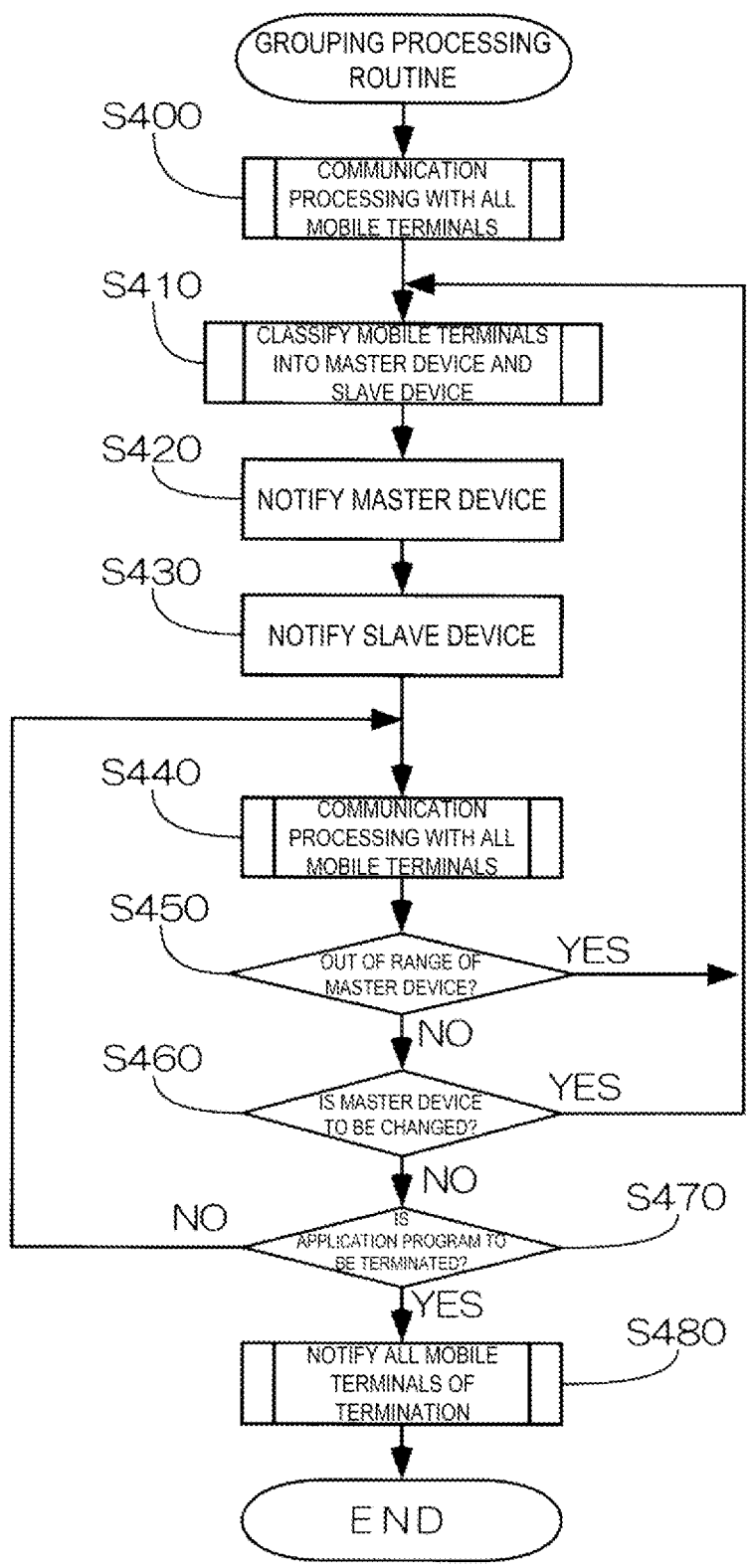
FIG. 8 is a flowchart illustrating grouping processing to be performed by a mobile terminal operating as a host of the second exemplary embodiment.

FIG. 8 is a flowchart illustrating a grouping processing routine to be executed by the mobile terminal 50*a* that is the host. In the second exemplary embodiment, a group made up of specific members such as a party made up of organized eight number of climbers, and a hiking companion is assumed to be users of the positioning system 10A, and the mobile terminal 50*a* of a specific member such as a group leader is assigned to the host.

Figure 9:
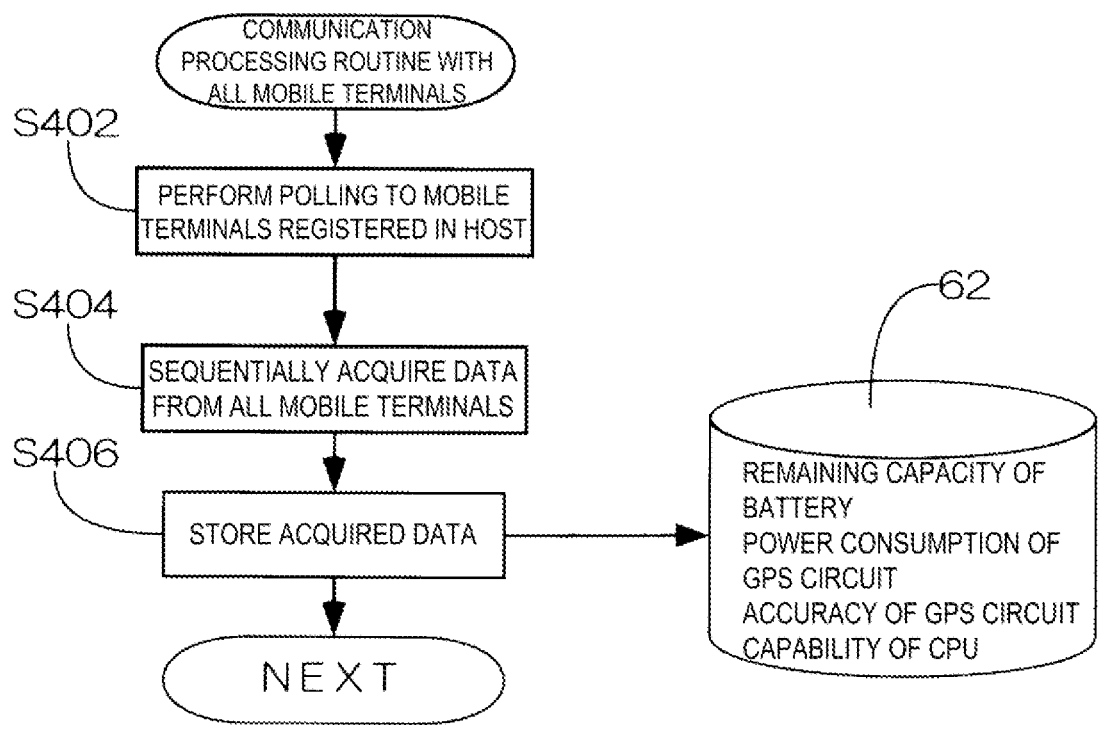
FIG. 9 is a flowchart illustrating communication processing with all mobile terminals that is to be performed by the mobile terminal operating as the host.

The mobile terminal 50a serving as the host performs the processing illustrated in FIG. 8 when use of the positioning system 10a is started. When the processing is started, the mobile terminal 50a serving as the host performs communication processing with all mobile terminals registered in advance (step S400). Details of the communication processing (step S400) are illustrated in FIG. 9. In the communication processing with all the mobile terminals, the host first performs polling to the mobile terminals registered in the host (step S402). Polling is performed using BLE beacons. The mobile terminals registered in the host may be all the mobile terminals registered in an address book when the mobile terminal 50a serving as the host is a mobile phone having a phone call function, or may be mobile terminals previously registered in a list in an application program that executes the grouping processing routine.

Since the mobile terminals 50b to 50h polled from the mobile terminal 50a serving as the host sequentially send data back to the host, the mobile terminal 50a serving as the host sequentially acquires the data (step S404), and stores the acquired data in a predetermined region of the memory 62 (step S406). Here, the data acquired from all the mobile terminals polled by the host is as follows in this exemplary embodiment:

Remaining capacity of the battery;
Power consumption during use of the GPS circuit 63;
Accuracy of the GPS circuit 63; and
Processing capability of the CPU 61. The processing capability of the CPU 61 includes, in addition to a processing speed, the number of bits that can be processed at a time, whether hardware configured to perform floating point arithmetic operations is included or not, and the like. The data may include data other than the above data. Further, when at least the remaining capacity of the battery 40 is included, other data may be omitted as appropriate.

An example of the data collected from all the mobile terminals 50 is illustrated in FIG. 10. As illustrated in the figure, the power consumption of the GPS circuit 63, the accuracy of the positioning, the capability of the CPU 61, and the like are different for each mobile terminal.

Figure 11:
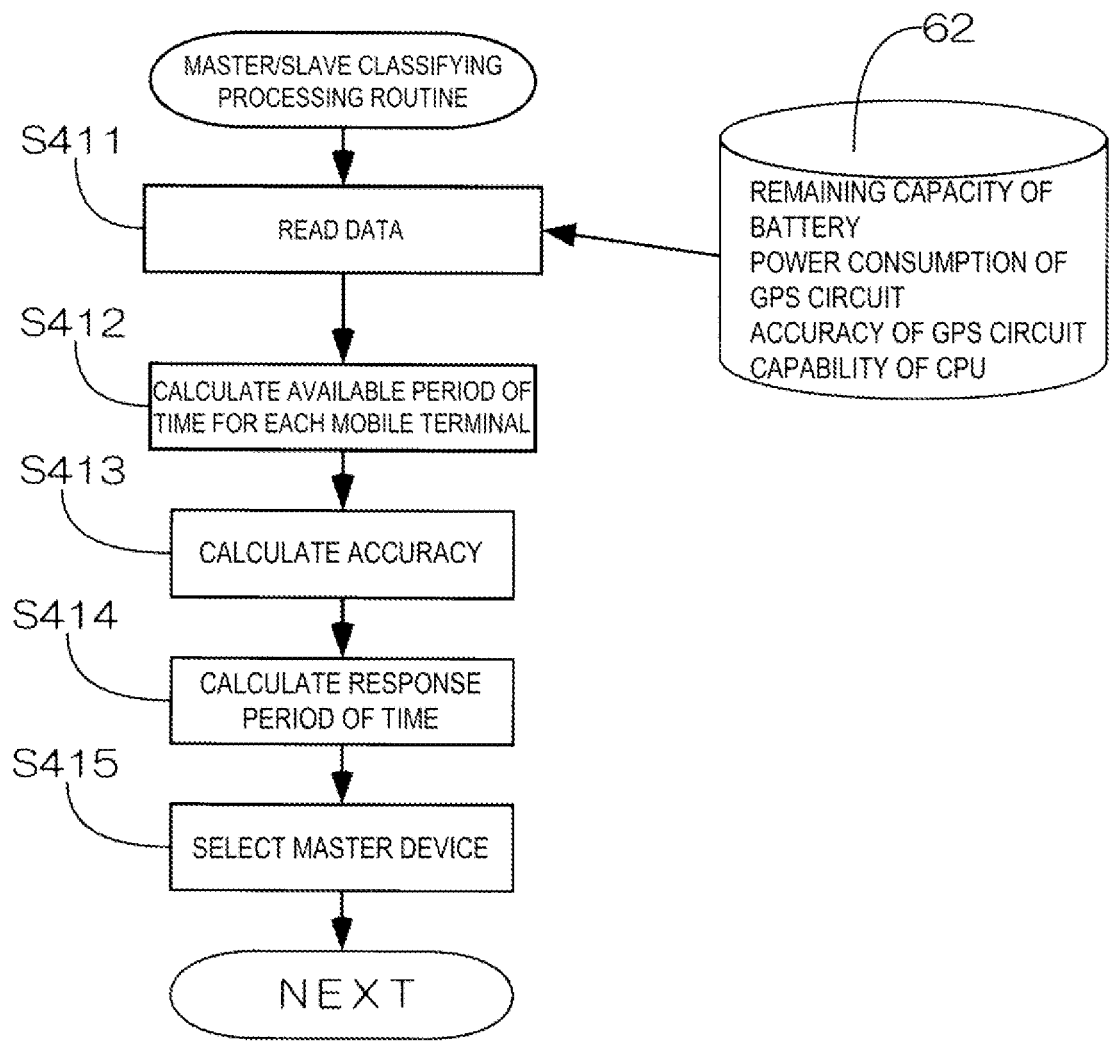
FIG. 11 is a flowchart illustrating master/slave classifying processing to be performed by the mobile terminal operating as the host.

After performing communication with all the mobile terminals (step S400) in this manner, the host classifies all the mobile terminals 50a to 50h in a group GRP into a master device and a slave device, based on the data (step S410). At this time, the host classifies itself into any one of them. Details of the classifying processing are illustrated in FIG. 11.

In the illustrated master/slave classifying processing, the host reads the data of all the mobile terminals from the memory 62 (step S411), and calculates an available period of time for each mobile terminal (step S412). The available period of time is determined based on the current remaining capacity of the battery 40 in consideration of the power consumption by the GPS circuit 63. In this case, power consumption excluding the GPS circuit 63 of the mobile terminal and the power consumption of the GPS circuit 63 may be added, that is, a total power consumption of the mobile terminal may be used to determine the available period of time, or the remaining capacity is simply divided by the power consumption of the GPS circuit 63 to determine the available period of time by regarding an exhaustion period of time of the battery 40 that becomes shorter by turning on the GPS circuit 63 as an indicator. As will be described below, in the group GRP, a mobile terminal operating as a master device imposes a load on the battery 40 compared to a mobile terminal operating as a slave device. Accordingly, when the degree of the load of turning on the GPS circuit 63 is compared, it may not be appropriate to make a comparison in a state where power consumption of other circuit elements, for example the CPU 61 is included. Alternatively, by using the total of the power consumption, the available period of time may be calculated as a period of time when the remaining capacity of the battery 40 drops down to a predetermined value, for example, 20% of a fully charged state.

Next, the accuracy of positioning of each mobile terminal is calculated (step S413). The accuracy of positioning is largely depending on the accuracy of the GPS circuit 63, but is also influenced by the processing capability of the CPU 61. For this reason, the accuracy of positioning is calculated considering the processing capability of the CPU 61. A response period of time is then calculated (step S414). The response period of time is a total period of time required to determine a current position, that is, a period of time required to complete the positioning. It is desirable that the period of time required to complete the positioning be short.

In this manner, the available periods of time, the accuracy of the positioning, and the response period of time of all the mobile terminals 50a to 50h including the host are taken into consideration to select a master device (step S415). In this exemplary embodiment, the mobile terminal having the longest available period of time and the mobile terminal having the highest accuracy of positioning are selected as the master devices.

After the classification into the master device and the slave device, as described above (step S410), the mobile terminal 50a serving as the host notifies the mobile terminals selected as the master devices (step S420). Furthermore, the mobile terminal 50a serving as the host notifies the mobile terminals other than the mobile terminals selected as the master devices, that is, the slave devices (step S430). As a result, in the example illustrated in FIG. 7, the mobile terminal 50b is the mobile terminal having the longest available period of time, and the mobile terminal 50g is the mobile terminal having the highest accuracy of positioning, so that the two number of mobile terminals 50b and 50g receive notification that they are the master devices. Each of the notified mobile terminals 50b and 50g, similarly to the first exemplary embodiment, stores the fact that the notified mobile terminal itself is the master device in a predetermined region of the memory 62. In addition, six number of mobile terminals other than the two number of mobile terminals, namely, the mobile terminals 50a, 50c to 50f, and 50h are notified as the slave devices. Each of the notified mobile terminals 50a, 50c to 50f, and 50h, similarly to the first exemplary embodiment, stores the fact that the notified mobile terminal itself is the slave device in a predetermined region of the memory 62.

In this manner, the respective mobile terminals 50a to 50h notified of the master device or the slave device execute the master device processing routine and the slave device processing routine described in the first exemplary embodiment (see FIG. 4). As a result, similarly to the first exemplary embodiment, each of the mobile terminals 50b and 50g set as the master devices operates as the first mobile terminal, uses the GPS circuit 63 to receive radio waves from the positioning satellites SS, and determines a current position, that is, the first current position. Each of the mobile terminals 50a and 50g set as the master devices displays the first current position and a map including the first current position on the display 75 or in the HMD 60, and outputs the first current position to the mobile terminals 50a, 50c to 50f, and 50h set as the slave devices by using BLE beacons. Each of the mobile terminals 50*a*, 50*c* to 50*f*, and 50*h* as the slave devices that have received the BLE beacons acquires the first current position from the BLE beacon, determines a second current position from a relative positional relationship with the master device and the strength of the BLE beacon, and displays the second current position and a map including the second current position on the display 75 or in the HMD 60. Thus, among the eight number of mobile terminals 50*a* to 50*h* included in the group GRP, only the two number of mobile terminals 50*b* and 50*g* turn on the GPS circuit 63 to perform positioning, and the other mobile terminals 50*a*, 50*c* to 50*f*, and 50*h* turn off the GPS circuit 63 to reduce an amount of power consumption. As a result, the amount of power consumption of all the eight number of mobile terminals configuring the group GRP is reduced, and the mobile terminal set as the slave device can last the battery 40 long in spite of performing the positioning.

Figure 7:
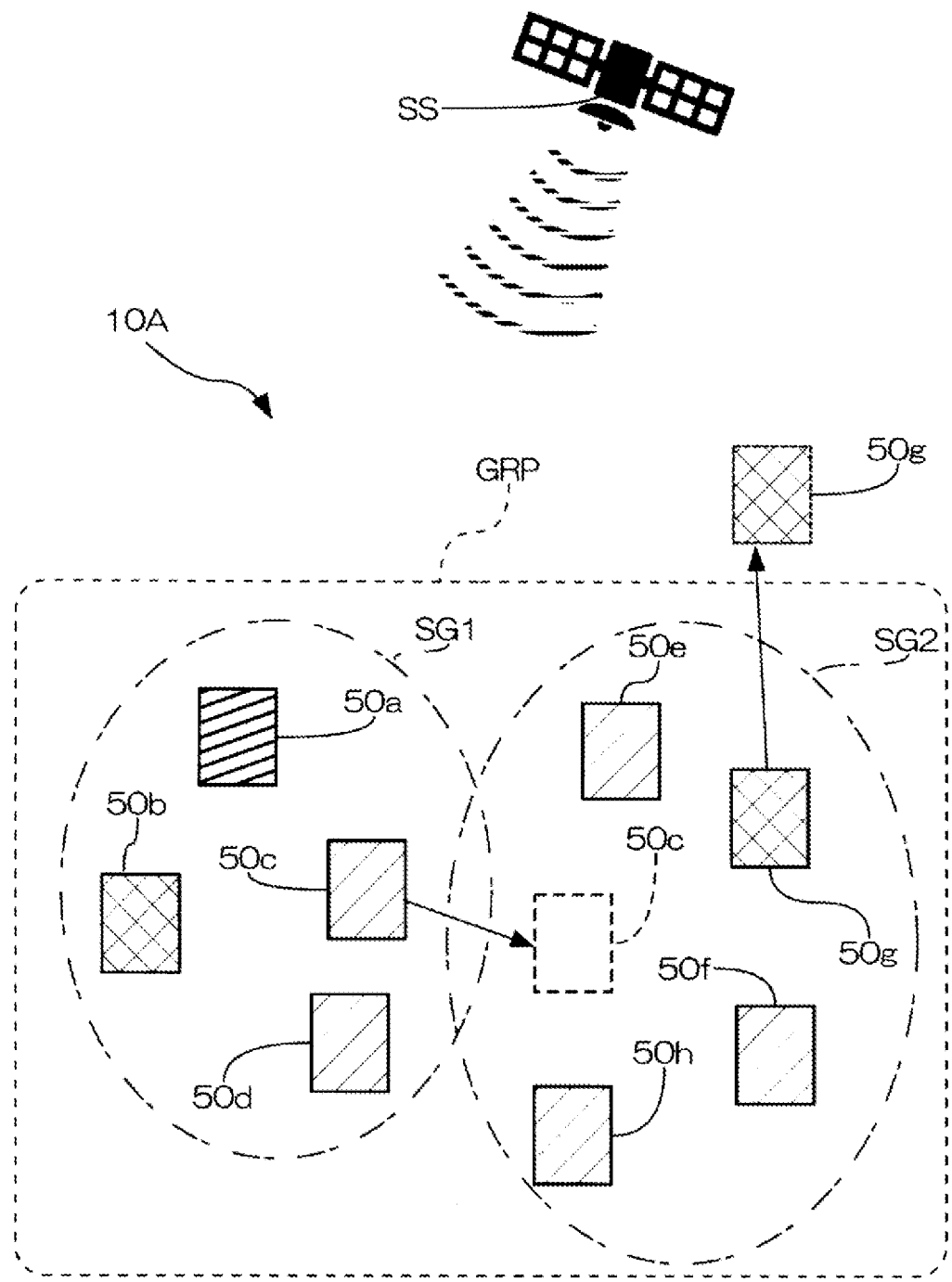
FIG. 7 is a schematic configuration diagram of a positioning system 10A of a second exemplary embodiment.

In this exemplary embodiment, since the number of mobile terminals belonging to the group GRP is as many as eight, the mobile terminals that are the slave devices near the mobile terminals 50*a* and 50*g* set as the master devices are divided into subgroups SG1 and SG2. In other words, as illustrated in FIG. 7, among the eight number of mobile terminals 50*a* to 50*h* included in one group GRP, the mobile terminal 50*b* that is set as the master device, that uses the GPS circuit 63 serving as the positioning device to perform positioning, and that outputs the identified first current position by using a BLE beacon, and other mobile terminals 50*a*, 50*c*, and 50*d* each of which approaches the mobile terminal 50*b*, receives the BLE beacon from the mobile terminal 50*b*, and determines a second current position configures the subgroup SG1. On the other hand, among the eight number of mobile terminals 50*a* to 50*h*, the mobile terminal 50*g* that is set as the master device, that serves as the first mobile terminal to use the GPS circuit 63 to perform positioning, and that outputs the identified first current position by using a BLE beacon, and the other mobile terminals 50*e*, 50*f*, and 50*h* each of which approaches the mobile terminal 50*g*, receives the BLE beacon from the mobile terminal 50*g*, and determines a second current position configures the subgroup SG2.

In the group GRP, the configuration of the subgroups can be reorganized again at any time because communication using BLE beacons is possible. For example, when the mobile terminal 50*c* that belongs to the subgroup SG1, that has received the BLE beacon from the mobile terminal 50*b* serving as the master device, and that has determined the second current position comes closer to the mobile terminal 50*g* than the mobile terminal 50 according to the movement of the user, the mobile terminal 50*c* may move from the subgroup SG1 to the subgroup SG2. Each mobile terminal 50 set as the slave device may determine the strength of the BLE beacon to decide the subgroup to which the mobile terminal 50 belongs. By treating the mobile terminals close to one another as the subgroup SG1 or SG2, the number of mobile terminals using a current position at which one of master device performs positioning is reduced, so that it is possible to improve the accuracy of positioning, to shorten the period of time required for the processing, and the like.

Moreover, in this exemplary embodiment, the mobile terminal 50*a* operating as the host further performs step S440 and the following processing and performs switching of the mobile terminal operating as the master device, reorganizing the group GRP, and the like. Specifically, the mobile terminal 50*a* serving as the host performs the processing in steps S400 to S430 described above, and continues communication processing with all the mobile terminals after setting each mobile terminal to the master device or the slave device (step S440). At this time, the mobile terminal 50*a* serving as the host communicates with the other mobile terminals 50*b* to 50*h* by using the BLE beacon. As a result, it is determined whether or not at least one of the mobile terminals 50*b* and 50*g* set as the master devices is out of the communication range by using the BLE beacon (step S450). Even when the master device is not still out of the range (step S450: "NO"), it is determined whether the master device is to be changed or not (step S460).

When the determination in any one of steps S450 and S460 is "YES", the processing returns to step S410, and the above-described processing is repeated from the processing of classifying all the mobile terminals into the master device and the slave device. As a result, when the mobile terminal set as the master device becomes out of the range, or when due to the reduction in the remaining capacity of the battery 40, the use of the GPS circuit 63 needs to be changed to another mobile terminal, master devices and slave devices are newly set once again, while the remaining capacity of the battery 40, the performance of the positioning, and the like of each of all the mobile terminals are being considered.

For example, in a case where when viewed from the mobile terminal 50*a* serving as the host, the mobile terminal 50*g* is, according to the movement of the user, out of the range of the BLE beacon from the group GRP, the mobile terminal 50*a* serving as the host detects out-of-range (step S450: "YES"), and since the mobile terminal 50*g* has been the master device as the mobile terminal having the highest accuracy of positioning, the mobile terminal having the highest accuracy of positioning is selected among the remaining mobile terminals 50*a* to 50*f*, and 50*h* to set the selected mobile terminal as a new master device.

Also, even in a case where no master device is out of the range, when the remaining capacity of the battery 40 of the master device is reduced, and thus, it is determined that when processing that determines the first current position is continued with the GPS circuit 63 turned on, a period of use time of the mobile terminal decreases and problems will occur (step S460: "YES"), the classification into master devices and slave devices is similarly performed again. The mobile terminal other than the mobile terminals that have been operating as the master device, that is, the mobile terminal that has been operating as the slave device is newly set again as a master device. When the remaining capacity of the mobile terminal 50*b* is reduced, the mobile terminal that has the large remaining capacity of the battery 40, and that is considered to have the longest available period of time is set as the master device, among the mobile terminals operating as the slave devices. Note that, when the remaining capacity of the battery 40 is getting small in each of all the mobile terminals, the number of the master devices may be changed to only one to release the subgroups.

By performing the above-described processing, while the operation as the positioning system 10A is continuing, when the mobile terminal serving as the master device becomes out of the range, and when the remaining capacity of the battery 40 of the mobile terminal serving as the master device is reduced, another mobile terminal in the communication range with the mobile terminal 50*a* serving as the host is set as a new master device, continues to perform positioning of a first current position, and transmits the positioned first current position to the mobile terminals serving as the other slave devices. Thus, the mobile terminal operating as the slave device can continue to perform positioning of the second current position without turning on the GPS circuit 63, and can detect a position of itself to display the detected position together with a map while suppressing the reduction in the remaining capacity of the battery 40.

After that, the mobile terminal 50a serving as the host determines whether the application program is to be terminated (step S470), and in a case where the user manually presses an "end" button, arrives at the destination, or the like, when determining that the application program is to be terminated, the mobile terminal 50a sends a notification of the end to all the mobile terminals (step S480), and exits to "END" to terminate the processing routine.

According to the second exemplary embodiment described above, the notification of the first current position is made by using the BLE beacon only to the respective mobile terminals 50 belonging to the group GRP, and when the mobile terminal serving as the master device separates from the group GRP because the mobile terminal becomes out of the range at a position where the BLE beacon does not reach, or when the consumption of the battery 40 becomes large, the master device can be changed, so that the total power consumption can be reduced while positioning is being performed in the mobile terminals belonging to the group GRP. Moreover, in this exemplary embodiment, since a plurality of mobile terminals, here two number of mobile terminals 50b and 50g, are operated as master devices in one group GRP, the exemplary embodiment also has an advantage that even when one of the mobile terminals fails to perform positioning of the first current position for some reasons, the subgroup including the master device normally operating is not affected. Furthermore, the BLE beacon reaches within one group GRP, so it is also easy to change so as to receive the first current position from the master device that has been performing positioning of the first current position.

In the exemplary embodiment described above, when the mobile terminal 50g operating as the master device becomes out of the range, the mobile terminal operating as the master device is selected again from among all the mobile terminals, according to the remaining capacity of the battery 40, the accuracy of positioning, and the like, but in such a case, the mobile terminal 50a temporarily or permanently serving as the host may operate as the master device. Moreover, the mobile terminal responsible for the host may be sequentially changed. As mentioned above, since the host communicates whether an out-of-range mobile terminal is present or not, or the like, with other mobile terminals all the time, the power consumption of the host is higher than those of the mobile terminals serving as the other slave devices, and thus, it is also preferable to switch the host at predetermined intervals. The switching of the host can be achieved by various techniques, such as a method of passing a token and the like in a predetermined order.

C. Third Exemplary Embodiment

The positioning system 10A according to a third exemplary embodiment includes a similar device configuration to that of the second exemplary embodiment, and only a mobile terminal that performs positioning of a second current position differs. In the first and second exemplary embodiments, the second current position is determined on a side of the mobile terminal operating as the slave device (FIG. 4, step S320). In contrast, in the third exemplary embodiment, similar processing is performed on a side of the mobile terminal operating as the master device. Specifically, the mobile terminal set as the slave device in step S140 illustrated in FIG. 3 periodically outputs a BLE beacon by using the communication unit 65. Moreover, the mobile terminal operating as the master device periodically receives the BLE beacon from each mobile terminal operating as the slave device to detect its relative positional relationship. Then, the mobile terminal operating as the master device determines a second current position of each mobile terminal operating as the slave device, and causes the second current position to be included in a BLE beacon to output the BLE beacon, for each mobile terminal. In this manner as well, the acquisition of the first current position in the mobile terminal operating as the master device, the display including a map, the acquisition of the second current position in the mobile terminal operating as the slave device, and the display including a map can be achieved, similarly to the first and second exemplary embodiments.

In the above-described third exemplary embodiment, the mobile terminal serving as the master device determines the second current position of the mobile terminal serving as the slave device. In this case, when one of the other mobile terminals serving as the slave devices becomes out of the range, the mobile terminal may be processed so as to be temporarily removed from the group GRP. Specifically, from the mobile terminals subjected to the processing that determines the second current position, the mobile terminal that becomes out of the range may be removed. The removed mobile terminal becomes out of the range, and cannot acquire the BLE beacon, so the current position cannot be acquired. When this state continues for a predetermined time or longer, the mobile terminal that becomes out of the range may stop acquiring the BLE beacon from the master device, and turn on the power supply to the GPS circuit 63 to perform the positioning by itself.

In the second and third exemplary embodiments described above, the master device and the slave device may be classified based on the power consumption by the GPS circuit, or the like, but other elements may be considered and classified. For example, even when the mobile terminals being used are the same type, the power consumption varies depending on the application program operating on each mobile terminal, the way of holding map data, and the like, or whether or not the mobile terminal is in an airplane mode. Thus, the power consumption for each operating application program is registered in advance for each of the cases of operating in the foreground or operating in the background, depending on a current operating state, the power consumption to be predicted in each mobile terminal may be determined, the battery duration time (available period of time) may be determined from the power consumption to be expected, and the master device/slave device may be classified. Alternatively, the power consumption may be actually measured for one minute, or the like, and the power consumption may be used to divide the remaining capacity of the battery to determine the available period of time for each mobile terminal. Furthermore, the user of the mobile terminal may input the presence or absence of a mobile battery, and the capacity of the mobile battery, and may determine the available period of time of the mobile terminal with the capacity of the mobile battery included.

In each of the above-described exemplary embodiments, the mobile terminal operating as the first mobile terminal has been referred to as the master device because the mobile terminal operating as the first mobile terminal determines the first current position, and transmits the determined first current position to the other mobile terminals, and the mobile terminal operating as the second mobile terminal has been referred to as the slave device, because the mobile terminal operating as the second mobile terminal receives the first current position or the calculated second current position, but the names has been used for convenience of understanding, so have no specific meaning.

In each of the above-described exemplary embodiments, the BLE beacon includes the ID identifying the mobile terminal, information of the first current position, and the like, but may additionally include data related to the user having each mobile terminal. Examples of such data may include information such as tracking information, biological information such as pulse, and information of a degree of fatigue and the like. In addition, information that requests to change a role as the master device or the host, and the like may be included. Further, beacons may be exchanged only to check that the mobile terminals are within the range where the BLE beacons reach.

D. Other Aspects (1) The present disclosure can be implemented as the following aspects. One of the aspects is a positioning system configured to perform positioning using N mobile terminals, where N is an integer of two or greater. In the positioning system, each of the mobile terminals includes a positioning device configured to perform positioning using a radio wave, a communication device having smaller power consumption than the positioning device, and being configured to detect a relative positional relationship with another mobile terminal using wireless communication, and a battery configured to supply power to at least the first and second positioning systems, wherein not less than one and less than N first mobile terminals among the mobile terminals are configured to activate the positioning device to perform positioning of a first current position, and a second mobile terminal other than the first mobile terminals among the mobile terminals is configured to at least reduce power to be used by the positioning device, and is configured to perform positioning of a second current position using information of a current position positioned by the first mobile terminal, and the relative positional relationship detected by the communication device.

In this way, in a positioning system that uses a plurality of mobile terminals, both a reduction in power consumption of the mobile terminals as a whole, and positioning of a current position in each mobile terminal can be achieved. Note that, as the mobile terminal, various mobile terminals such as a mobile phone such as a so-called smartphone, or a wearable device such as a tracker, and a smart watch can be used. The mobile terminal is a terminal having portability, and any form may be applicable as long as a terminal has portability, that is, operates by a battery such that the terminal is carried. Thus, not only a terminal being carried by a person, but also a terminal to be mounted on an apparatus can be applied to various apparatuses as long as the power consumption is a problem. For example, the mobile terminals may be mounted on a plurality of flight bodies, traveling bodies, or the like, and some of the mobile terminals operate as the first mobile terminals that perform positioning, and the other mobile terminals operate as the second mobile terminals, thereby reducing overall power consumption of flight bodies, traveling bodies, or the like moving as a group. Examples of the flight body are considered to include a drone, a radio-controlled airplane, or the like. There may be various types of toys such as a two-wheeled vehicle, a four-wheeled vehicle, a marine vessel, and a ball shaped traveling body that operate by batteries. As the wireless communication, beacons such as BLE beacons, WiFi®, or the like can be used. The first current position and the second current position acquired in this manner may be displayed on a display device or may be simply stored as tracking data or the like. Alternatively, the first and second current positions may be provided to the user by using longitude, and latitude. The provision may be performed by notifying by voice, or the like, in addition to the method such as displaying on the display device.

(2) In such a positioning system, the first mobile terminal may be any one of mobile terminals <1> to <3>,
<1> a mobile terminal in which power consumption of the positioning device is smaller than one of other mobile terminals, among the mobile terminals,
<2> a mobile terminal in which positioning accuracy of the positioning device is higher than one of other mobile terminals, among the mobile terminals, and
<3> a mobile terminal specified by manual operation in advance, among the mobile terminals. In this way, it is possible to easily determine which mobile terminal is to serve as the positioning device. In a case of <1>, a reduction in remaining capacity of the battery of the mobile terminal operating as the first mobile terminal can be suppressed, and in a case of <2>, the accuracy of the positioning can be improved.

(3) In such a positioning system, the second current position may be any one of positions [1] to [3],
[1] the first current position when a relative positional relationship between the first mobile terminal and the second mobile terminal is within a predetermined range,
[2] a position that is determined by the first mobile terminal adding a relative positional relationship with the second mobile terminal determined from the information to the first current position, and that is transmitted to the second mobile terminal by the first mobile terminal, and
[3] a position determined in such a manner that the second mobile terminal adds a relative positional relationship determined from the information to the first current position transmitted from the first mobile terminal in such a positioning system. In this way, the second current position can be easily determined. In a case of [1], the labor of an arithmetic operation or the like that determines the second current position can be saved, and in a case of [2], the second current positions of the respective mobile terminals can be collectively acquired. Furthermore, in a case of [3], the processing can be distributed because the second current position is determined by each mobile terminal.

(4) In such a positioning system, one of the N mobile terminals may operate as a host device, and the host device may be configured to perform processing of grouping the N mobile terminals, processing of selecting the first mobile terminal, and processing of selecting a mobile terminal other than the selected first mobile terminal as the second mobile terminal among the N mobile terminals. In this way, since the host decides which mobile terminal serves as the first mobile terminal and which mobile terminal serves as the second mobile terminal, the processing becomes easy. It is also easy to change conditions of selecting the first and second mobile terminals or the like.

(5) In such a positioning system, the grouping may be performed using wireless communication utilized by the communication device. In this way, the grouping can be easily performed. Alternatively, the grouping may be manually performed, that is, may be performed by each user manipulating the mobile terminal, or may be achieved by causing each mobile terminal to read a two-dimensional bar code or the like.

(6) In such a positioning system, when at least one mobile terminal that is the first mobile terminal among the grouped mobile terminals becomes outside a range of the wireless communication of the communication device, the host device may be configured to operate as the first mobile terminal instead of the first mobile terminal being outside the range of the communication. In this way, the first mobile terminal that becomes outside the communication range, that is, that becomes out of the range can be easily switched.

(7) When at least one mobile terminal that is the second mobile terminal among the grouped mobile terminals becomes outside the range of the wireless communication of the communication device, the host device may stop positioning of the second current position of the second mobile terminal being outside the range of the communication. In this way, unnecessary processing can be omitted.

(8) In such a positioning system, the positioning device is GNSS configured to receive a radio wave from a positioning satellite, and the communication device may be configured to use a Bluetooth® beacon. In this way, the positioning system can be easily configured by using existing technologies. Note that the positioning device configured to perform the positioning using a radio wave does not need to be limited to such GNSS, and a cellular positioning system using, for example, a communication network for mobile phones, such as OTDOA, or UTDOA, may be used. A device configured to perform positioning by using connection with a plurality of base stations for mobile phone communication is not limited to a device for 5G, and may be a known device. Note that the cellular positioning system may perform positioning in conjunction with the GNSS, as well as positioning using a communication network for mobile phones, and the system configuration is optional. Alternately, based on the environment in which the mobile terminal is used, for example, the cellular positioning system may be used in an area where the number of base stations is large, mainly in an urban area, a hybrid system such as A-GNSS+OTDOA may be used in an area where the number of base stations is small, and only GNSS, such as a GPS positioning system, may be used in an area where the number of base stations is equal to or less than one.

(9) In such a positioning system, the first mobile terminal and the second mobile terminal may include a display device configured to display the first current position or the second current position together with a map including the first current position or the second current position. In this way, the user can know the current position in an overlapped manner on the map. The map may be a plane map or a bird's eye map. Alternatively, the map may be a map including only roads, or may be a map including geographical features, or a map in which store information, and other various additional information are described.

(10) In such a positioning system, at least one of the display devices provided to the respective mobile terminals is a head-mounted display apparatus so that an external scene is visually recognizable, and the mobile terminal may cause the head-mounted display apparatus to display the first current position or the second current position and a map including the first current position or the second current position in an overlapped manner on the visually recognized external scene. This makes it easier to acquire the current position and map information because the current position and the map can be visually recognized in the overlapped manner on the external scene.

(11) As another aspect of the present disclosure, a mobile terminal can be provided. The mobile terminal configured to exchange information with another mobile terminal being in a predetermined communication range includes a positioning device configured to perform positioning using a radio wave, a communication device having smaller power consumption than the positioning device, and being configured to detect a relative positional relationship with another mobile terminal using wireless communication, and a battery configured to supply power to at least the first positioning system and the second positioning system, is configured to at least reduce power to be used by the positioning device when the mobile terminal is communicable with another mobile terminal configured to perform positioning a current position, and is configured to perform positioning of a current position using information of the current position of the other mobile terminal positioned by the other mobile terminal, and the relative positional relationship detected by the communication device. In this way, the power consumption of the mobile terminal can be reduced.

(12) As another aspect of the present disclosure, a non-transitory computer-readable storage medium storing a program to be executed by a computer configured to control a mobile terminal configured to communicate with another mobile terminal being in a predetermined communication range can be provided. This program implements, in a mobile terminal, a function of operating a positioning device configured to perform positioning using a radio wave, a function of operating a communication device having smaller power consumption than the positioning device, and being configured to detect a relative positional relationship with another mobile terminal using wireless communication, a function of at least reducing power to be used by the positioning device when the mobile terminal is communicable with another mobile terminal configured to perform positioning of a current position, and a function of using information of the current position of the other mobile terminal positioned by the other mobile terminal, and the relative positional relationship detected by the communication device to perform positioning of a current position.

(13) In each of the above-mentioned exemplary embodiments, a part of a configuration implemented by hardware may be replaced with software. At least a part of a configuration implemented by software may be implemented by a discrete circuit configuration. Further, when some or all of the functions of the present disclosure are implemented by software, the software (computer program) may be provided in a form stored in a computer-readable recording medium. The "computer-readable recording medium" is not limited to a portable recording medium such as a flexible disk and a CD-ROM, and includes various internal storage devices such as a RAM and a ROM and various external storage devices fixed to a computer such as a hard disk. In other words, the "computer-readable recording medium" has a broad range of definition including any recording medium configured to non-transitorily and fixedly store data packets.

The present disclosure is not limited to the exemplary embodiments described above, and can be achieved in various configurations without departing from the gist of the present disclosure. For example, appropriate replacements or combinations may be made to the technical features in the exemplary embodiments which correspond to the technical features in the aspects described in the SUMMARY section to solve some or all of the problems described above or to achieve some or all of the advantageous effects described above. Additionally, when the technical features are not described herein as essential technical features, such technical features may be deleted appropriately.

What is claimed is:

1. A positioning system including a first mobile terminal and a second mobile terminal, the positioning system comprising:
   each of the first mobile terminal and the second mobile terminal including:
      a positioning device that performs positioning using a radio wave;
      a communication device that has smaller power consumption than the positioning device, and that exchanges information with another mobile terminal using wireless communication; and
      a battery that supplies power to the positioning device and the communication device, wherein
   one of the first mobile terminal and the second mobile terminal performs positioning of a first current position,
   the other of the first mobile terminal and the second terminal reduces to lower power to be used by the positioning device than power to be used by the positioning device of the one of the first mobile terminal and the second mobile terminal,
   the other of the first mobile terminal and the second mobile terminal acquires the first current position from the one of the first mobile terminal and the second mobile terminal via the communication device, and the other of the first mobile terminal and the second mobile terminal sets the first current position to as a second current position when a relative positional relationship between the first mobile terminal and the second mobile terminal is within a predetermined range, and
   the other of the first mobile terminal and the second mobile terminal sets the second current position based on the first current position and a distance from the first mobile terminal to the second mobile terminal, when the relative positional relationship between the first mobile terminal and the second mobile terminal is without the predetermined range,
   wherein
   the first mobile terminal performs positioning of the first current position
   (i) when power consumption of the positioning device of the first mobile terminal is smaller than power consumption of the positioning device of the second mobile terminal, or
   (ii) when positioning accuracy of the positioning device of the first mobile terminal is higher than positioning accuracy of the positioning device of the second mobile terminal.

2. The positioning system according to claim 1, wherein the first mobile terminal operates as a host device, and the first mobile terminal performs processing of grouping with the second mobile terminal.

3. The positioning system according to claim 2, wherein the grouping is performed using wireless communication utilized by the communication device.

4. The positioning system according to claim 1, wherein the positioning device is GNSS configured to receive a radio wave from a positioning satellite, and the communication device is configured to use a Bluetooth® beacon.

5. The positioning system according to claim 1, wherein each of the first mobile terminal and the second mobile terminal include a display device configured to display the first current position or the second current position together with a map including the first current position or the second current position.

6. The positioning system according to claim 5, wherein at least one of the display devices provided to the respective mobile terminals is a head-mounted display apparatus configured so that an external scene is visually recognizable, and the mobile terminal configured to cause the head-mounted display device to display the first current position or the second current position and a map including the first current position or the second current position in an overlapped manner with the visually recognized external scene.

7. A mobile terminal configured to exchange information with another mobile terminal in a predetermined communication range, the mobile terminal comprising:
   a positioning device configured to perform positioning using a radio wave;
   a communication device having smaller power consumption than the positioning device, and being configured to detect a relative positional relationship with the other mobile terminal using wireless communication;
   a battery configured to supply power to at least the positioning device and the communication device, wherein
   the mobile terminal is
   configured to at least reduce power to be used by the positioning device, when the relative positional relationship between the other mobile terminal is within a predetermined range, the mobile terminal acquires and sets a position of the other mobile terminal to as to a current position, and
   when the relative positional relationship with the other mobile terminal is without the predetermined range, the mobile terminal sets the current position based on the position of the other mobile device and a distance from the mobile terminal to the other mobile terminal,
   wherein
   the other mobile terminal performs positioning of the position the other mobile terminal:
   (i) when power consumption of the positioning device of the other mobile terminal is smaller than power consumption of the positioning device of the mobile terminal, or
   (ii) when positioning accuracy of the positioning device of the other mobile terminal is higher than positioning accuracy of the positioning device of the mobile terminal.

8. A non-transitory computer-readable storage medium storing a program that is executed by a computer and is configured to control a mobile terminal configured to communicate with another mobile terminal in a predetermined communication range, the program being configured to achieve:
   on a mobile terminal,
   a function of operating a positioning device configured to perform positioning using a radio wave;
   a function of operating a communication device having smaller power consumption than the positioning device, and being configured to detect a relative positional relationship with the other mobile terminal using wireless communication;
   a function of at least reducing power to be used by the positioning device;
   a function of acquiring and setting position of the other mobile terminal to as to a current position when the relative positional relationship between the other mobile terminal is within a predetermined range; and a function of setting a current position based on the position of the other mobile device and a distance from the mobile terminal to the other mobile terminal when the relative positional relationship with the other mobile terminal is without the predetermined range the mobile terminal, wherein the other mobile terminal performs positioning of the position the other mobile terminal:

(i) when power consumption of the positioning device of the other mobile terminal is smaller than power consumption of the positioning device of the mobile terminal, or (ii) when positioning accuracy of the positioning device of the other mobile terminal is higher than positioning accuracy of the positioning device of the mobile terminal.

* * * * *